May 10, 1927.
H. O. HEM
1,627,702
PLATFORM LEVER MECHANISM FOR SCALES
Filed Feb. 25, 1920  7 Sheets-Sheet 2
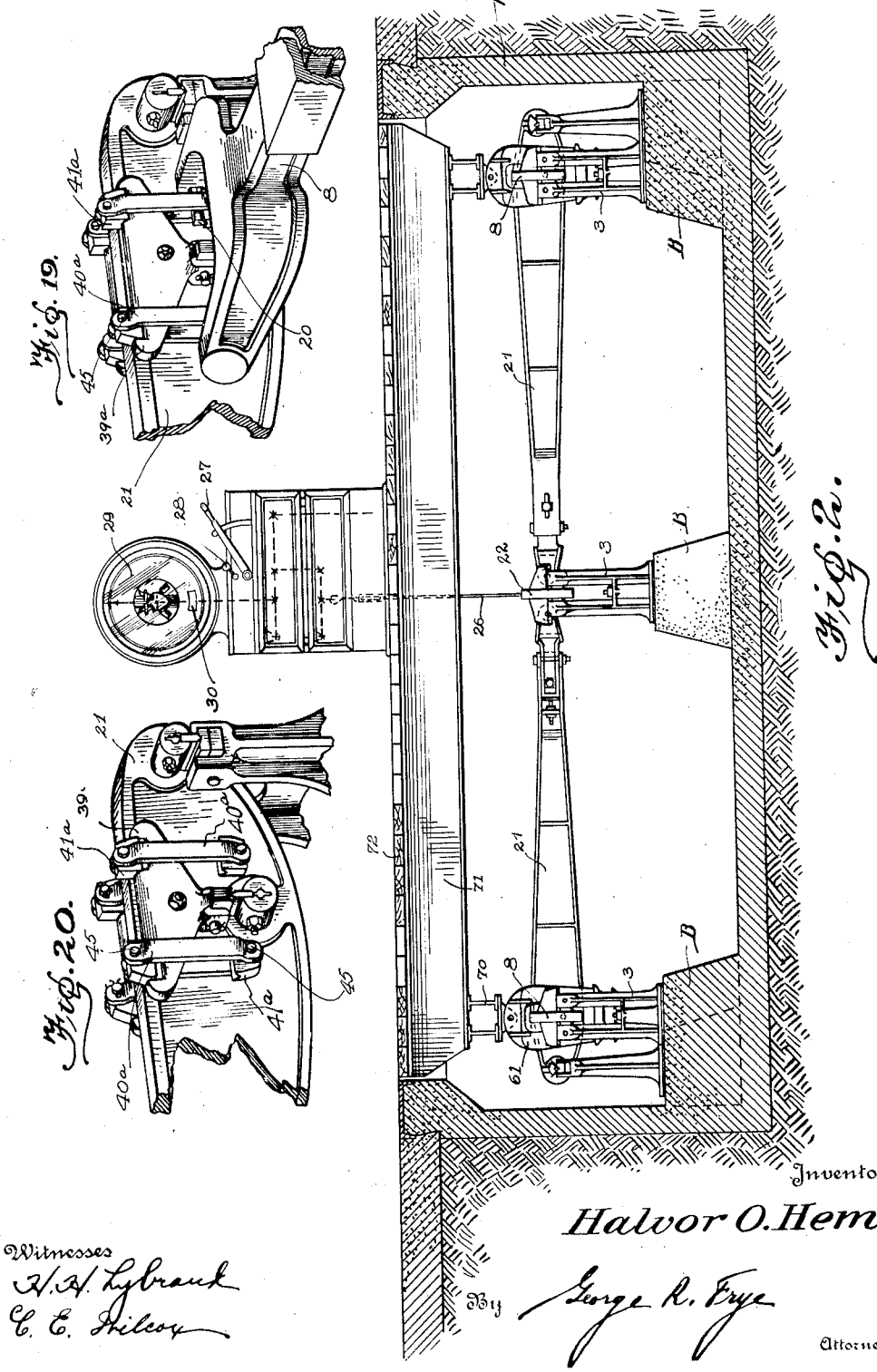
Inventor
Halvor O. Hem
By George R. Frye
Attorney
Witnesses
H. H. Lybrand
C. E. Wilcox

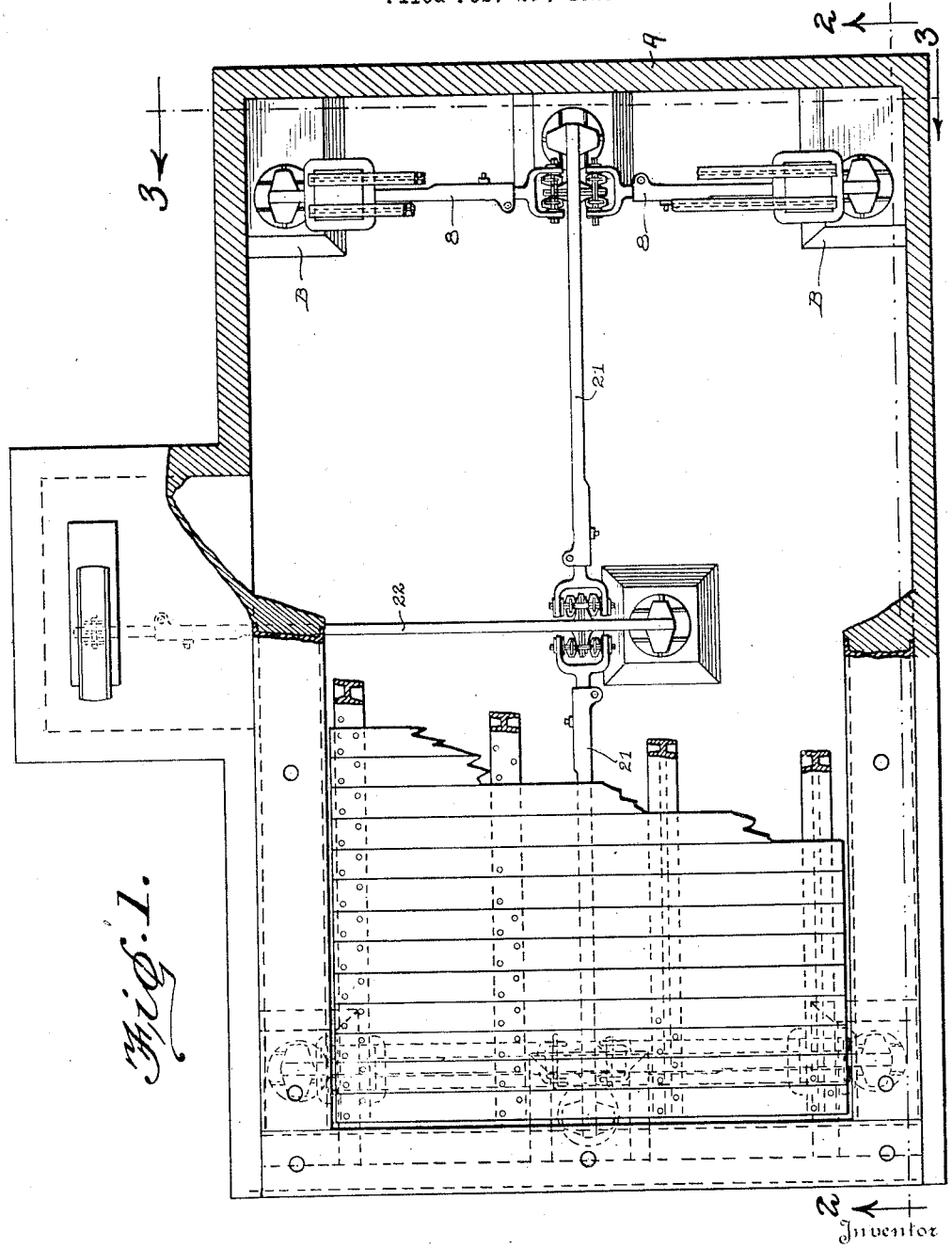

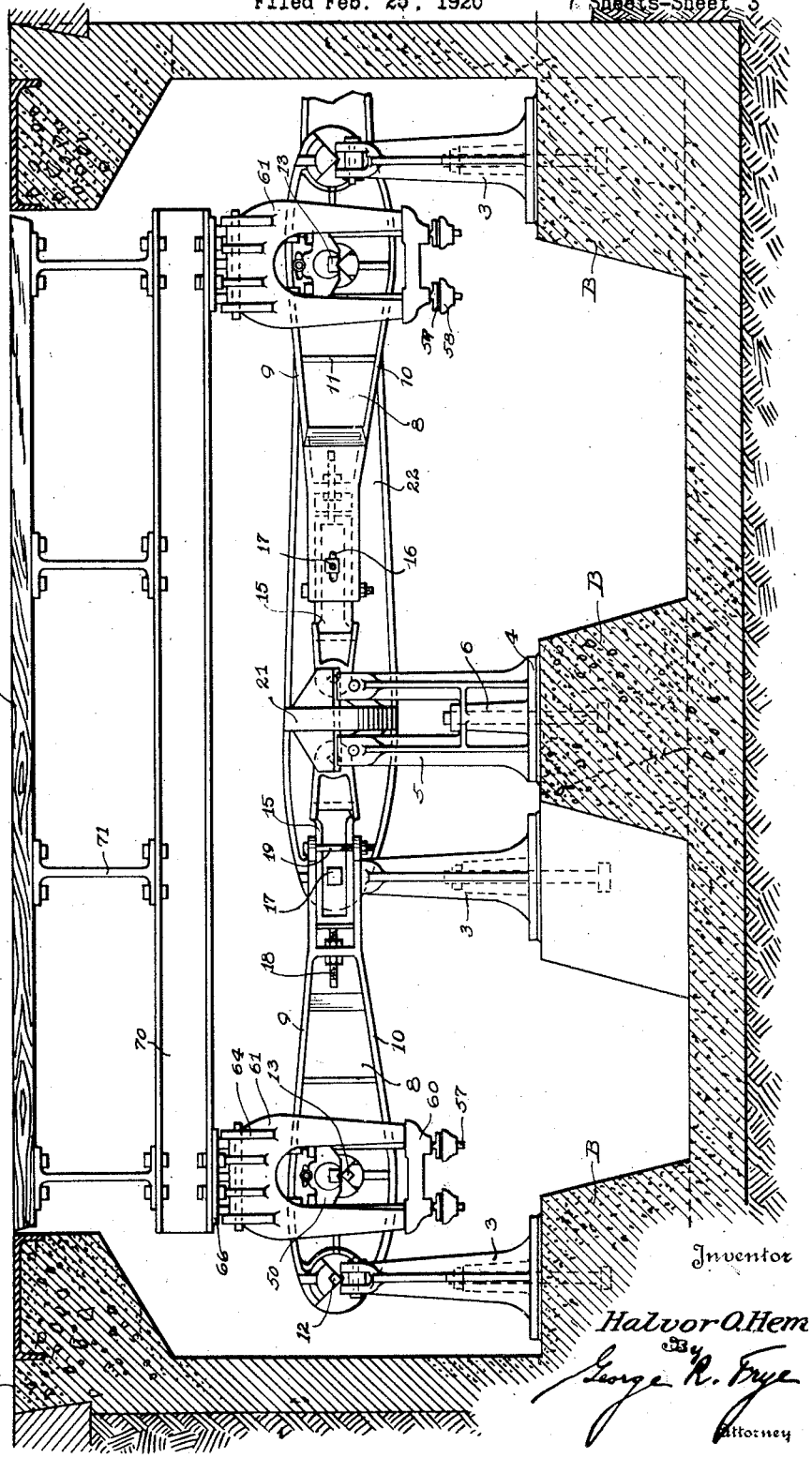

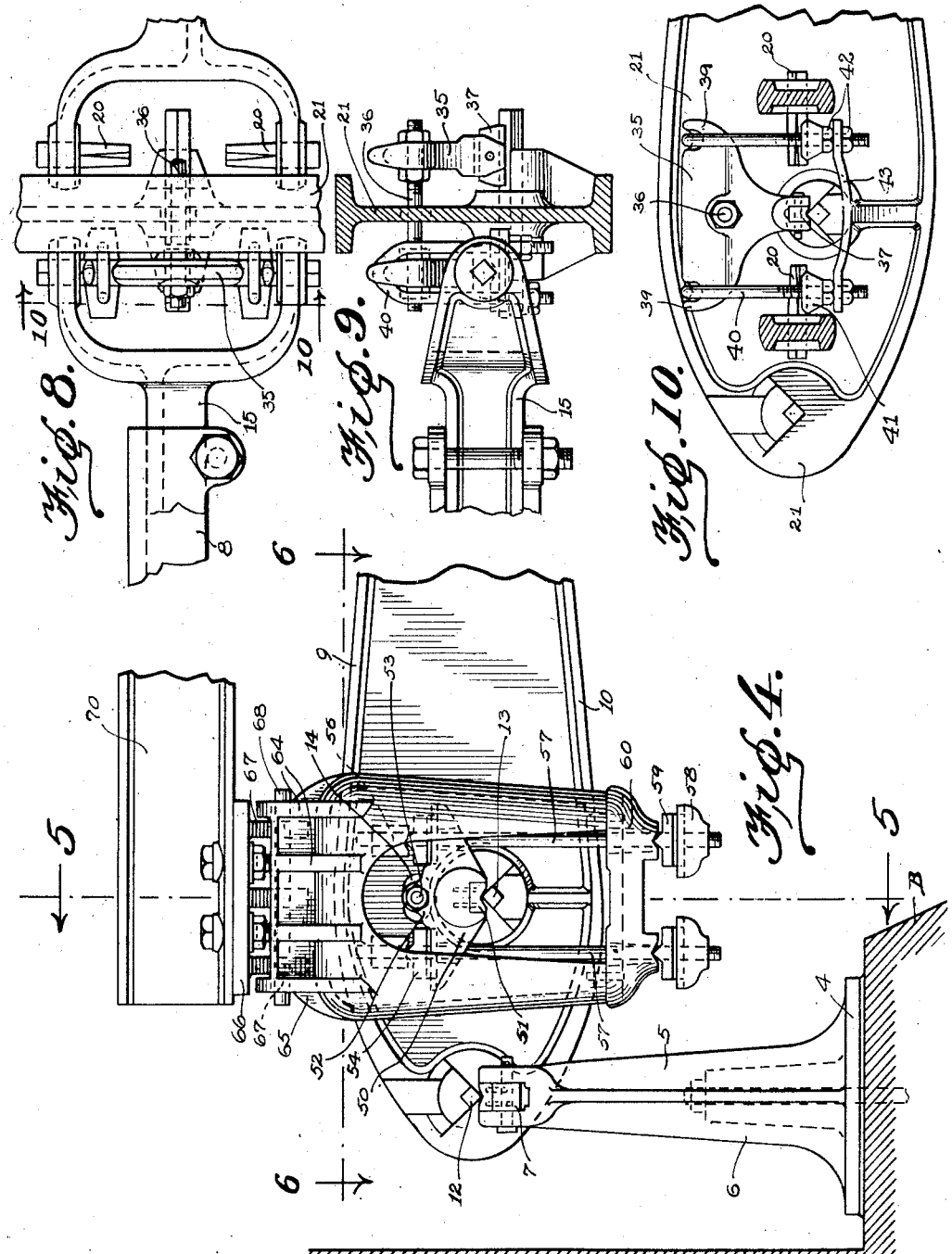

May 10, 1927.
H. O. HEM
1,627,702
PLATFORM LEVER MECHANISM FOR SCALES
Filed Feb. 25, 1920      7 Sheets-Sheet 5
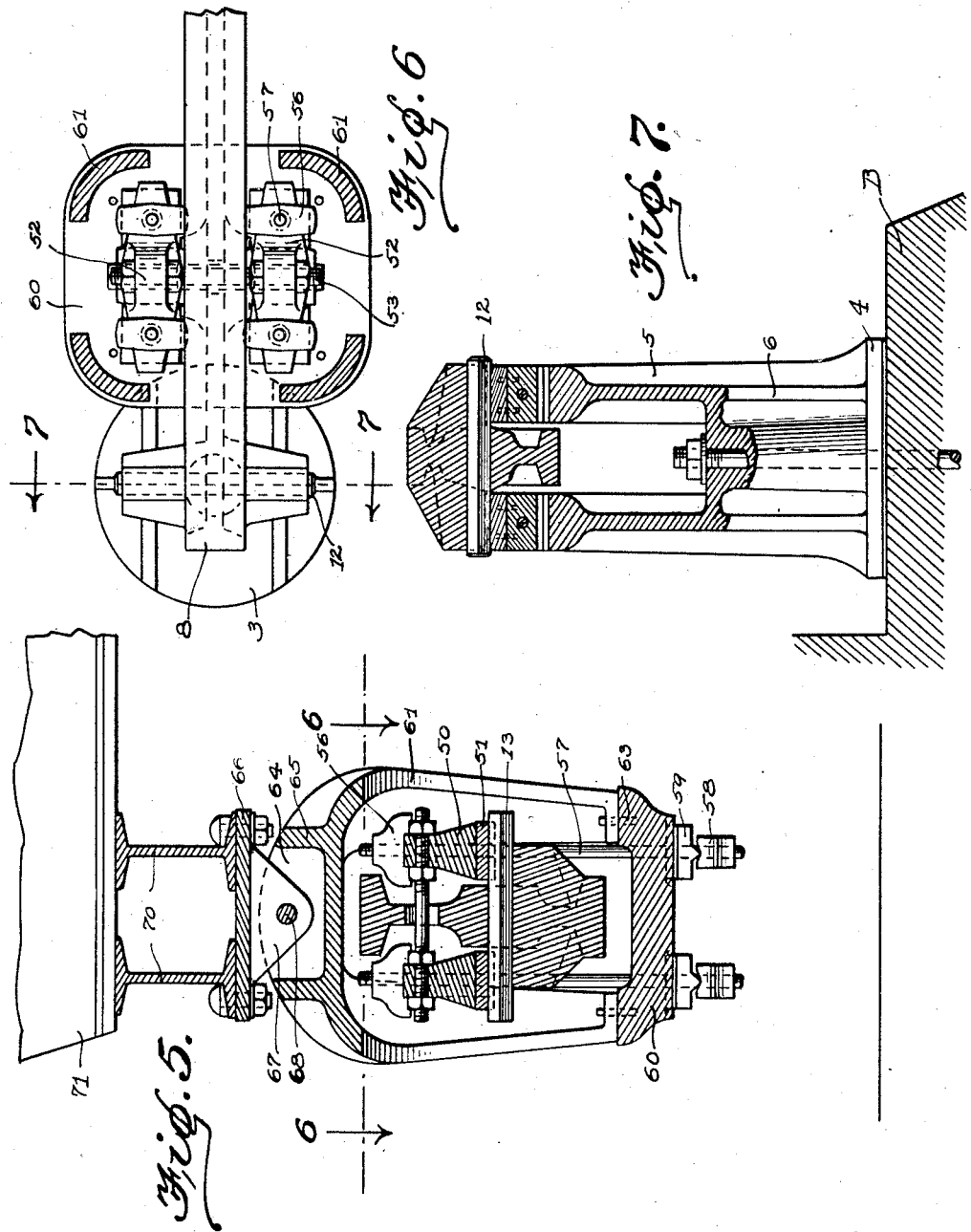
Inventor
Halvor O. Hem
By George R. Frye
Attorney
Witnesses May 10, 1927.
H. O. HEM
PLATFORM LEVER MECHANISM FOR SCALES
Filed Feb. 25, 1920    7 Sheets-Sheet 6
1,627,702
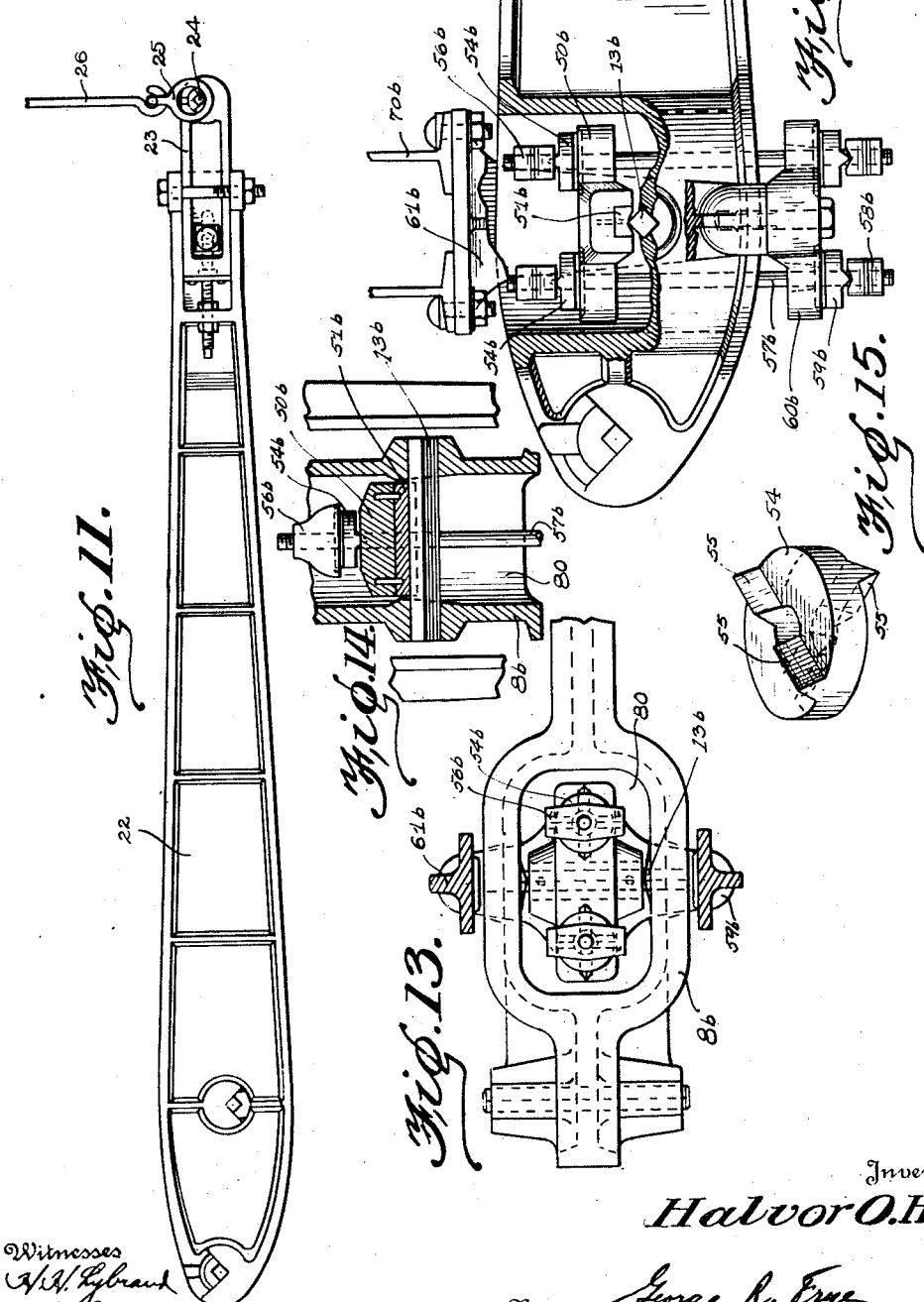
Inventor
*Halvor O. Hem*
By *George R. Frye*
Attorney
Witnesses May 10, 1927.
H. O. HEM
1,627,702
PLATFORM LEVER MECHANISM FOR SCALES
Filed Feb. 25, 1920 7 Sheets-Sheet 7
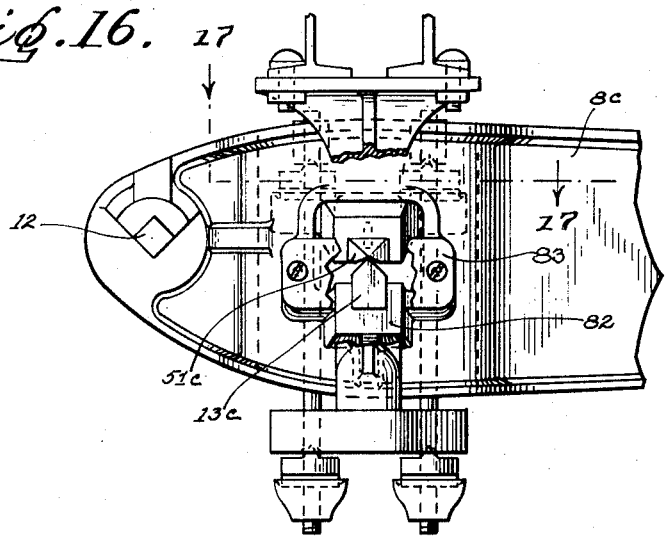
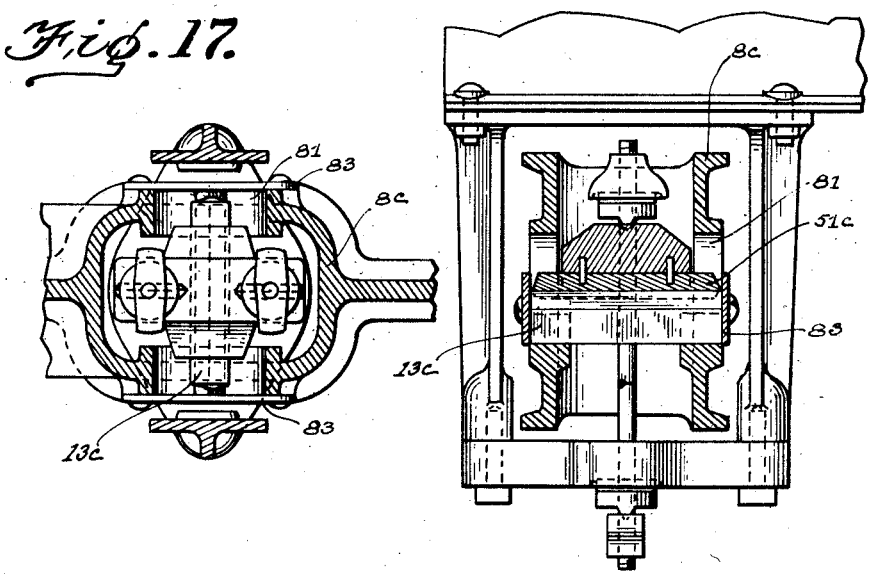
Inventor
Halvor O. Hem
Witnesses
H. H. Lybrand
C. E. Wilcox
By George R. Frye
Attorney Patented May 10, 1927.

1,627,702

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

PLATFORM LEVER MECHANISM FOR SCALES.

Application filed February 25, 1920. Serial No. 361,251.

This invention relates to weighing scales and particularly to scales designed to weigh comparatively heavy loads, such as loaded automobile trucks. In scales of this character the load is usually moved onto the platform from the side, and in order to relieve the pivots and bearings from excessive strain it is desirable to so support the platform that it may move or yield laterally when a truck or other load is moved upon it. It is, however, undesirable that the pivots move in their bearings except during weighing operations, since the movement due to lateral swinging or yielding of the platform causes excessive wear. It is also imperative for correct weighing that the platform return absolutely to its normal position relative to the lever mechanism after each lateral swinging movement. One of the principal objects of the invention is to provide improved means for so supporting the platform upon the platform lever mechanism that the platform may have free swinging movement in all directions without rocking or other movement of the scale pivots in their bearings, the construction being such that the platform will invariably return to its normal position when the truck or other load comes to rest thereon.

Another important object is to support the platform by means which allows deflection of the joists or framework without resulting in an out-of-plumb or other injurious condition of the weighing mechanism.

Other objects are to so construct the platform supports that the height and level of the platform may be adjusted without disturbing the lever mechanism; to so construct the platform lever mechanism as to facilitate replacing and plumbing the connections; to so arrange the parts that one or more levers may be removed without displacing the platform; to eliminate the effects of forces other than vertical; to make practicable the use of interchangeable fulcrum stands; to connect the levers by means of a flexible connection with the pivot edges in the same horizontal plane; and to provide an improved means for connecting nose irons to the levers.

Other objects and advantages will be apparent from the following description, in which reference is had to the accompanying drawings illustrating preferred embodiments of my invention and wherein similar reference numerals designate similar parts throughout the several views.

In the drawings:—

Figure 1 is a plan view of a scale embodying my invention, part of the platform and pit coping being broken away to show the arrangement of the platform levers;

Figure 2 is a vertical section taken through the scale embodying my invention, the sectional plane being substantially that indicated by the line 2—2 of Figure 1;

Figure 3 is a vertical section of the scale taken substantially as indicated by the line 3—3 of Figure 1;

Figure 4 is an enlarged elevation of a part of one of the main levers showing a fulcrum stand and platform support in connection therewith;

Figure 5 is a vertical section taken substantially as indicated by the line 5—5 of Figure 4;

Figure 6 is a horizontal section taken substantially as indicated by the line 6—6 of Figures 4 and 5;

Figure 7 is a view of a fulcrum pivot and fulcrum stand, parts being in section, taken substantially as indicated by the line 7—7 of Figure 6;

Figures 8, 9 and 10 are respectively a detail plan, side elevation, and front elevation showing the means connecting the levers;

Figure 11 is an elevation of the beam lever;

Figure 12 is an elevation of a modified form of main lever and a co-operating form of platform support, part of the lever being broken away;

Figure 13 is a plan view of the same, the supporting yoke being shown in section;

Figure 14 is a vertical section taken through the load pivot of the lever shown in Figure 12;

Figure 15 is a perspective view of a plate having knife edges formed thereon, forming part of the universally-movable hanger for supporting the platform;

Figure 16 is a detail side elevation, with parts broken away, of a further modified form of main lever and co-operating platform support;

Figure 17 is a horizontal section taken substantially on the line 17—17 of Figure 16;

Figure 18 is a detail front elevation of the parts shown in Figure 16, the lever and bearing being in section;

Figure 19 is a detail perspective view of a modified form of lever connecting device; and Figure 20 is a similar view of the same with one of the main levers removed.

Any suitable form of load-offsetting mechanism may be employed in connection with the platform lever mechanism of my invention. I have shown in Figures 1, 2 and 3 the scale as assembled with the platform levers in a specially prepared pit A of concrete, such as is usually used to contain the platform lever mechanism of heavy scales. Rising from the floor of the pit is a series of concrete pedestals B which support the fulcrum stands 3, seven in number, which are of identical construction. Each fulcrum stand consists of a circular base 4 with a pair of uprights 5 projecting from the upper face thereof and a boss 6 located between the said uprights and adapted to receive a bolt, the lower end of which is imbedded in the pedestal. The upper end of each upright is bifurcated and carries a pivoted bearing 7 consisting of an upper plate of hardened wear-resisting steel attached by means of dowel pins to a pivoted block, which may be of cheaper metal.

Fulcrum stands, which are situated at the corners of the pit, support the main platform levers 8, four in number in the embodiment shown. The construction of these levers in the same scale is identical. In the form shown in Figures 1 to 10 inclusive, each of the main levers 8 consists of a plate-like body so shaped as to properly bear the strains to which it is subjected and having top and bottom flanges 9 and 10 connected at intervals by vertical ribs 11. The fulcrum pivots are formed of hardened steel bars 12, having lower knife edges, which pass through the levers and project from each side thereof, the knife edges of the projecting portions resting on the bearings 7. The load pivots are also formed of knife-edged, hardened steel bars which pass through the levers and project from each side thereof with their knife edges turned upwardly. Each of the levers is provided above its load pivot with an oval perforation 14, the purpose of which will presently appear.

At the nose iron end of each lever the flanges 9 and 10 are parallel, making this part of the lever channel-shaped. The interior of the channel so formed is easily machined to fit the nose iron 15. The body of the lever 1 forms the closed side of the channel and is slotted at 16 to receive a clamping bolt 17, and a vertical rib adjacent the channel 14 of the lever is thickened and perforated to receive an adjusting bolt 18 which is swiveled in the nose iron 15. Adjacent the end of the lever each flange is provided with a perforated ear through which a bolt 19 passes. The length of the lever may be adjusted by turning the bolt 18 and the parts may be secured in adjusted position by tightening the clamping bolt 17. The bolt 19 serves to tie the flanges together so that strains which would otherwise be borne by the top flange alone are distributed through both flanges. The nose iron 15 is bifurcated and each furcation carries a downturned knife edge pivot member 20, the edges of the pivot members 20 being in alignment.

As clearly shown in Figure 1, a pair of the main levers 8 is located at each end of the pit, the levers of each pair extending from their fulcrum stands toward each other. Located between the adjacent ends of each pair of main levers 8 and extending toward the center of the pit is a center lever 21 which, except in that it is longer and lighter proportionally to its length, is similar to one of the main levers 8. Each center lever is fulcrumed upon one of the stands 3 and the knife edge of its load pivot is in the same horizontal plane as the knife edges of the pivot members 20 of the main levers. Located between the adjacent ends of the center levers 21 is a beam lever 22 which extends perpendicularly to the center lever 21 from one of the fulcrum stands 3 located near the center of the pit to a point beneath the weighing beam of the scale. Except in that the nose iron 23 is not bifurcated, this lever is also generally similar to one of the main levers 8 of the scale. The nose pivot 24 is formed of a knife-edged, hardened steel bar which projects from each side of the nose iron with the knife edge turned downwardly. The lever 22 is connected to the weighing beam of the scale by means of a stirrup 25 and a steel-yard 26.

Since my invention does not reside in the load-offsetting or indicating mechanism per se of the scale, I have not illustrated them in detail and will not particularly describe them. I prefer, however, to use my present invention in connection with load-offsetting and indicating mechanisms such as are described in my co-pending application Ser. No. 96,511, filed May 10, 1916, which consists of a weighing beam shown diagrammatically as housed in a cabinet located over the pit above the nose iron 23, which beam is capable of use either alone or in connection with automatic pendulum load-offsetting mechanism housed in the casing supported on the cabinet. A handle 27 is provided to assist in manipulating the beam weighing mechanism, and a handle 28 serves as a convenient means for manipulating a locking device. The weight offset by the pendulums is indicated on the dial 29 and the weight offset by counterpoises on the beam is indicated at a window 30 in the dial 29.

In order to transmit the load from the main levers to the steelyard 26, the downwardly-acting force is transmitted from the nose pivots of the main levers 8 to the load pivots of the center levers 21, and the nose pivots of the center levers likewise bear downwardly indirectly upon the load pivots of the beam lever 22. Since the planes of movement of the main levers and the center levers are perpendicular to each other, the knife edges of the nose pivots of the main levers and the load pivots of the adjacent center levers have relative movement in two directions, this being true even though the knife edges of the adjacent pivots be always in the same horizontal plane. In order to permit this movement to take place without friction and consequent impairment of the efficiency of the scale, I have evolved the flexible connections illustrated in Figures 8 to 10 and Figures 19 and 20.

Referring first to the form shown in Figures 8 to 10 it is to be noted that I employ for connecting the main levers to each center lever a pair of T-shaped saddle blocks 35, one block of each pair being located on each side of the center lever. A threaded rod 36 passes through a perforation in the center lever (corresponding to the perforation 14 in the main lever) and carries at its ends pairs of nuts which are turned up against the saddle blocks, as shown in Figure 9. The saddle blocks are thus secured together. The perforation is sufficiently large to permit the bolt to move therein to any extent necessary in a weighing operation without contacting the lever.

The lower ends of the saddle blocks carry hardened steel bearing blocks 37 which rest upon the upturned knife edges of the center lever load pivots, and a bearing on the pivots along the full line of contact is secured by rockably mounting the bearing blocks upon pins 38.

The upper edge of each saddle block is notched as at 39 adjacent each end, the bottoms of the notches being crowned, and resting in each of the said notches is the bight of a U-bolt 40. The crowned bottom of the notch is more sharply curved than the bight of the U-bolt, and the diameter of the notch is less than that of the bolt so that the bolt is capable of universal movement in the notch. The legs of the bolts support bearing blocks 41 upon which the nose pivots bear, the height of the bearing blocks 41 being adjustable by means of nuts 42 whereby the knife edges of the pivots 20 may be brought into the same horizontal plane as the knife edge of the adjacent load pivot of the lever 21. The lower ends of each pair of U-bolts are tied together by means of straps 43 so that there is no danger of any of the bearing blocks slipping from under its pivot 20.

As the main levers swing upwardly and downwardly during the weighing operations the nose pivots 20 move slightly toward and away from the center lever to which they are connected, and the U-bolts, swinging laterally of the saddle blocks in the notches 39, allow this movement without binding. Since the load pivot of the lever 21 swings about the fulcrum pivot in the arc of a circle, the load pivot and the saddle block 35 have a slight lateral movement relative to the adjacent main lever. The U-bolts, swinging parallel to the lever 21 in the notches 39, also allow this movement without binding. The connections between the center levers 21 and the beam lever 22 are identical in all respects with those just described.

The form of connection shown in Figures 19 and 20 is similar in most respects to the one shown in Figures 8, 9 and 10, and for the sake of brevity will be described by pointing out the differences. In this form the walls of the notches 39ª are straight and the bottoms are wedge-shaped in cross-section, so that they form a ridge which has substantially a knife edge. In place of the U-bolts 40 and bearings 41 I employ pairs of links 40ª. The bearings are connected to the links by means of pins 45, which gives the links the desired freedom of movement parallel to the lever 21 and also makes the bearings self-aligning with the knife edges. The nose pivots 20 of the main lever 8 rest in the lower bearings 41ª, and absolute freedom of movement toward and away from the lever 21 is permitted by the rocking of the links 41ª on the ridges in the bottoms of the notches 39ª and the knife edges of the pivots 20. When this form of connection is used between the main levers and the central levers it is also used between the center levers and the beam levers.

In the form of platform-supporting device most clearly shown in Figures 4, 5 and 6 I employ a pair of saddle blocks 50, each of which has a V-grooved hardened steel bearing 51 set into its under side and secured in place by dowel pins. The bearings 51 rest upon the knife edges of the main lever load pivots 13.

Directly above the bearing each saddle block is provided with a perforated ear 52 and a threaded rod 53 extends from one saddle block of the pair to the other, passing through the perforation 14 in the lever 8 and being secured to the saddle blocks by means of nuts. The perforation 14 is large enough to allow the bolt 53 to move therein during weighing operations without contacting the lever 8. The upper surface of each saddle block is formed with a pair of aligned V-grooves which extend parallel to the central plane of the lever 8. A perforated disk 54 having a pair of aligned wedge-shaped projections 55 on each face thereof is placed with the projections on its lower face in the grooves formed in the upper surface of the saddle block 50. The angle at the edge of each wedge-shaped projection is sharper than that at the bottom of the groove in which it rests, so that the projection is free to rock in the groove and thus forms substantially a knife edge pivot. The edges of the projections on the upper face of the disk 54 are at right angles to the edges of the projections on the lower face thereof (see Figure 15), and resting upon the upper projections is a bearing block 56, the lower surface of which is grooved to rockably receive the projections. Each block 56 is provided with a vertical threaded bore located directly above the perforation in the disk 54. The saddle block is also provided with a vertical bore which registers with the said perforation and flares downwardly. A threaded rod 57 of less diameter than the perforation in the disk 54 or the flaring bore in the saddle block 50 passes upwardly through the said bore and perforation and is screwed into the bearing block 56. Since the rod 57 is supported by the edges of the wedge-shaped projections 55 it may freely swing laterally in all directions. Screwed upon the lower end of each rod 57 is a bearing block 58 identical with the block 56 but inverted with respect thereto. A disk 59 identical with the disk 54 is supported with its lower projections in the grooves of the bearing block 58.

The rods 57 supported by each main lever 8 are four in number, two of them being supported by each saddle block. Suspended by each set of four rods is a plate-like member 60. This member lies beneath the member 8 and is provided with upwardly-flaring bores which permit free passage and free swinging movement of the rods 57. The lower face of the member 60 has formed therein a set of parallel grooves to receive the projections on the upper faces of the disks 59.

Standing upon the upper face of the member 60 is a supporting member 61 in the form of a double yoke which straddles the lever 8. The lower ends of the legs of the yoke are turned inwardly to form feet 62 which are secured in place upon the member 60 by means of pins 63. Upon the upper surface of the bight of the yoke is formed series of ribs 64 extending transversely of the lever 8 and connected by longitudinally-extending ribs 65. A supporting plate 66 having a series of downwardly-extending flanges 67 formed thereon lies above the yoke 61 with the flanges 67 extending between the ribs 64. The ribs 64 and flanges 67 are pierced by a hardened steel rod 68 which thus forms the pintle of a hinge, one member of which is the yoke 61, the other member being the supporting plate 66. The main girders 70 of the scale are bolted to the supporting plates 66, the platform joists 71 are bolted to the girders 70, and a platform planking 72 is secured upon the joists. With this construction when the joists are flexed under a heavy load the supporting plate 66 merely turns upon the pintle 68 and the rods 57 are not thrown out of plumb.

In the construction shown in Figures 12, 13 and 14 a main lever $8^b$ is used, which is formed with a large vertical opening or well 80 across which the hardened steel bar constituting the load pivot $13^b$ extends. A single saddle block $50^b$, generally similar in shape and function to the saddle block 50, is located within the well 80. The saddle block $50^b$ has a hardened bearing block $51^b$ set into its lower face, the bearing $51^b$ being somewhat longer than the bearing 51 and resting throughout its length on the upturned knife edge of the load pivot $13^b$. Disks $54^b$, identical with the disks 54 previously described, rest with their knife edges in V-grooves of the upper face of the saddle block $50^b$, and bearing blocks $56^b$, identical with the blocks 56, rest upon the upper knife edges of the disks $54^b$. Rods $57^b$, identical with the rods 57, depend from the blocks $56^b$ through the disks $54^b$ and bores in the saddle block $50^b$ and support at their lower ends bearing blocks $58^b$ and disks $59^b$. Resting upon the knife edges of the disks $59^b$ is a plate-like member $60^b$ similar in function to the plate member 60 but differing in shape therefrom by reason of the fact that it is designed to be supported by two disks $54^b$ instead of four and in turn to support the two legs of a single yoke instead of four legs of a double yoke. A support $61^b$, substantially yoke-shaped, straddles the lever $8^b$ and stands upon the member $60^b$, and the upper face of the bight of the yoke is bolted directly to the main girders $70^b$ of the scale platform.

The construction shown in Figures 16, 17 and 18 differs substantially from that shown in Figures 12, 13 and 14, in that the walls of the well in the lever $8^c$ are provided with openings 81 into which the ends of a longer bearing $51^c$ may extend, and in that the load pivot is somewhat differently formed and secured in the lever. The bar forming the load pivot $13^c$ is substantially gable-shaped in cross-section and the lower portion thereof is inserted in seats 82 formed in the lower sides of the openings 81. Plates 83 secured to the sides of the lever 8ᵉ prevent endwise movement of the load pivot bar and form end thrust bearings for the bearing 51ᶜ.

The upper edge of the pit in which a scale of this type is usually assembled is formed with a coping C which overhangs the walls of the pit. When the scale is erected the edge of the platform comes into juxtaposition with the coping, and, owing to inaccuracies in building the pit or for other reasons, it is sometimes difficult to bring the bolt holes in the platform girders into registration with the bolt holes in the supporting plate 66 or other platform support. With my construction, however, all that is necessary is to tilt the yoke-shaped support by screwing the lower bearing block 58 upwardly or downwardly on one or more of the rods 57 until the holes are in registration. This procedure does not cause an out-of-plumb condition in the platform supporting mechanism since the rods 57 remain plumb.

Owing to the circumstances that my suspension members are straight rods hung from knife edges, the axes of which intersect the longitudinal axes of the rods, an out-of-plumb condition is more easily detected than it would be if links were used, for the reason that a link may appear to be plumb when it is, in fact, hanging from a point at one side of the center of its curved end.

Being supported only upon the knife edges of the disks 54 and 59, the platform structure may freely swing laterally in all directions and will invariably come to rest in its normal position. This tends to enhance the dependability of the scale, since any change in the bearing points of the suspension members or any failure to return to normal position sets up forces having vertical components which injuriously affect the accuracy of the scale.

During all the swinging movements of the rods 57 they remain parallel and the saddle blocks 50 are thus prevented from rocking upon the load pivots 13. There is, therefore, no relative movement of the pivots 13 and their bearings 51 due to lateral movement of the platform, and the only movement of the pivots and bearings is their slight movement as they perform their weighing functions. The pivots therefore remain sharp and efficient for greatly extended periods.

With my construction the height of the platform may be adjusted without disturbing the levers by simply turning the bearing blocks 58 on the rods 57 or turning the rods in the blocks 56. It is sometimes desirable that the platform conform to the contour of the surrounding ground or the slope of an adjacent floor. When this is the case one end of the platform may be raised or lowered by manipulating the bearings 58, and the platform thus given the desired incline while the levers remain level.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a scale, in combination, a plurality of levers, a load pivot on each lever, platform supports swingingly carried by said load pivots, and a platform structure hinged on said supports.

2. In a scale, in combination, a lever, a load pivot thereon, a yoke-like platform support carried by said load pivot, and a platform structure pivoted upon the bight of said yoke-like support.

3. In a scale, in combination, a lever, a load pivot thereon, a platform support carried by said load pivot, said support having a plurality of ribs thereon, a plate having a plurality of flanges interdigitated with the ribs of said support, a pintle passing through said ribs and flanges, and a platform structure secured upon said plate.

4. In a scale, in combination, a lever, a load pivot thereon, a yoke-like support carried by said load pivot, said support having a plurality of upstanding ribs upon the bight thereof, a plate having a plurality of flanges interdigitated with the ribs of said support, a pintle piercing said ribs and flanges, and a platform secured upon said plate.

5. In a scale, in combination, a lever, a load pivot thereon, a platform support suspended from said load pivot, and a platform structure hinged to said platform support on an axis at right angles to said load pivot.

6. In a scale, in combination, a lever, a load pivot thereon, a plate-like member, means for suspending said member from said load pivot and maintaining it substantially horizontal during swinging movements, and a yoke-like platform support straddling said lever and standing upon said plate-like member.

7. In a scale, in combination, a lever, a load pivot thereon, a saddle block carried by said load pivot, a pair of rods universally connected to said saddle block and depending therefrom, a platform support universally connected to said rods, and means for adjusting the effective length of said rods.

8. In a scale, in combination, a lever, a load pivot thereon, a bearing member carried by said pivot, a depending member universally pivoted by means of knife edges in perpendicular planes to said bearing member, and a platform support universally pivoted, by means of knife edges in perpendicular planes, to said depending member.

9. In a scale, in combination, a lever, a load pivot thereon, a bearing member carried by said load pivot, a depending rod universally connected to said bearing member by means of knife edges at right angles to each other, and a platform support universally connected, by means of knife edges at right angles to each other, to the lower end of said rod.

10. In a scale, in combination, a lever, a load pivot thereon, a saddle block carried by said load pivot, rods each universally connected to said saddle block by means of knife edges at right angles to each other and depending therefrom, and a platform support universally connected to each of said rods by means of knife edges at right angles to each other, the effective lengths of said rods being adjustable.

11. In a scale, in combination, a lever, a load pivot thereon, a bearing member carried by said load pivot, a plate supported by said bearing member and having a link contact therewith, a depending member supported by said plate and having contact therewith on a line at right angles to the first-mentioned line of contact.

12. In a scale, in combination, a lever, a load pivot thereon, a bearing member carried by said load pivot, a plate supported by said bearing member, said plate having V-shaped projections on the upper and lower sides thereof, the apices of said projections resting upon said bearing member and a depending member supported by the other of said projections.

13. In a scale, in combination, a lever, a load pivot thereon, a bearing member carried by said load pivot, a plate having V-shaped projections on the upper and lower sides thereof, the apices of said projections lying in perpendicularly planes, the apex of one of said projections resting upon said bearing member, said plate having an opening therein, a block supported upon the upper of said projections, a depending rod passing through said opening, and a platform support universally connected to said rod.

14. In a scale, in combination, a lever, a load pivot thereon, a bearing member carried by said load pivot, said bearing member having an opening therein, a plate having an opening therein, and upper and lower wedge-shaped projections thereon, the lower projection resting on said bearing member, a block supported upon said upper projection, a rod fixed to said block and depending through the openings in said plate and said bearing member, a second block fixed upon said rod, a second plate, said second plate having a lower wedge-shaped projection engaging said second block and an upper wedge-shaped projection engaging a platform support.

15. In a scale, in combination, a lever, a load pivot thereon, a saddle block carried by said load pivot, said saddle block having a pair of openings therein, plates having openings therein and upper and lower wedge-shaped projections thereon, the lower projections resting on said saddle block, upper bearing blocks supported upon said upper projection, rods fixed to said bearing blocks and depending through the openings in said plates and said saddle block, lower bearing blocks fixed upon said rods and plates having lower wedge-shaped projections engaging said lower bearing blocks, and upper wedge-shaped projections engaging a platform support.

16. In a scale, a universal pivot member consisting of a plate having a wedge-shaped projection upon its upper face and a wedge-shaped projection upon its lower face, the apices of said projections lying in perpendicular planes.

17. In a scale, a universal pivotal connection consisting of a plate having a central opening therein, a wedge-shaped projection on its upper face and a wedge-shaped projection on its lower face, the apices of said projections lying in perpendicular planes.

18. In a scale, in combination, a lever, a load pivot projecting from each side thereof, a saddle block on each side of said lever, said saddle blocks being supported on said load pivot, means for tying said saddle blocks together, and a platform supported from said saddle blocks.

19. In a scale, in combination, a lever having a perforation therein, a load pivot projecting from each side of said lever, a saddle block on each side of said lever, said saddle blocks being supported upon said load pivot, means passing through said perforation for tying said saddle blocks together, and platform supported from said saddle blocks.

20. A lever having a pair of substantially horizontal flanges projecting laterally therefrom, a nose iron carried between said flanges, and means for tying said flanges together.

21. A lever having a pair of flanges projecting laterally therefrom, a nose iron carried between said flanges, ears on said flanges, and a bolt connecting said ears.

22. In a scale, in combination, a lever having a bifurcated nose, aligned nose pivots projecting from the furcations, a second lever having a load pivot extending between said furcations, and means connecting the said pivots.

23. In a scale, in combination, a lever having a bifurcated nose, aligned nose pivots projecting from the furcations, a second lever having a load pivot extending between said furcations, and flexible means connecting the said pivots.

24. In a scale, in combination, a lever having a bifurcated nose, aligned nose pivots projecting from the furcations, a second lever having a load pivot perpendicular to said nose pivots, a bearing block on said load pivot, and links universally conected to said bearing block and to said nose pivots.

25. In a scale, in combination, a lever having a bifurcated nose, aligned nose pivots projecting from the furcations, a second lever having a load pivot thereon, a substantially T-shaped saddle block supported on said pivot, and a pair of links universally connected to said saddle block and to said nose pivots.

26. In a scale, in combination, a lever having a bifurcated nose, aligned nose pivots projecting from the furcations, a second lever having a load pivot thereon, a saddle block supported on said load pivot, upper bearing blocks pivoted upon said saddle block on axes parallel to the axis of said nose pivots, links pivoted to said bearing blocks on axes perpendicular to the axis of said nose pivots, and lower bearing blocks pivotally connected to said links and supporting said nose pivots.

27. In a scale, in combination, a pair of levers having bifurcated noses, aligned nose pivots projecting from the furcations of each lever, a third lever having a load pivot extending from each side thereof, a saddle block on each side of said third lever, said saddle blocks being supported upon said load pivot, means for tying said saddle blocks together, and links universally connected to said saddle blocks and said nose pivots.

28. In a scale, in combination, a pair of levers having bifurcated noses, aligned nose pivots projecting from the furcations of each of said levers, a third lever having a load pivot projecting from each side thereof, a saddle block on each side of said third lever, said saddle blocks being supported upon said load pivot, upper bearing blocks pivoted upon said saddle blocks, on axes parallel to the axis of said nose pivots, links pivoted to said bearing blocks on axes perpendicular to the axis of said nose pivots, and lower bearing blocks pivotally connected to said links and supporting said nose pivots.

29. In a scale, in combination, a lever having a knife edge nose pivot, a lever having a knife edge load pivot, the knife edges of said pivots lying in substantially the same horizontal plane, and a flexible connection between said nose pivot and said load pivot.

HALVOR O. HEM.